United States Patent
Fricke et al.

(10) Patent No.: US 7,584,072 B2
(45) Date of Patent: Sep. 1, 2009

(54) METHOD FOR DETERMINING CORRECTION VALUES FOR THE MEASURED VALUES OF POSITIONS OF STRUCTURES ON A SUBSTRATE

(75) Inventors: Wolfgang Fricke, Netphen (DE); Linda Gundal, Braunfels (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 0 days.

(21) Appl. No.: 12/147,703

(22) Filed: Jun. 27, 2008

(65) Prior Publication Data
US 2009/0024351 A1   Jan. 22, 2009

(30) Foreign Application Priority Data
Jul. 17, 2007   (DE) .................. 10 2007 033 619

(51) Int. Cl.
*G01P 11/00* (2006.01)
(52) U.S. Cl. .................................... 702/150
(58) Field of Classification Search ................ 702/150; 219/121.71; 250/548, 491.1; 345/173; 427/554; 178/18.05, 18.01; 356/400, 601; 355/53; 430/5
See application file for complete search history.

(56) References Cited

U.S. PATENT DOCUMENTS

| | | | |
|---|---|---|---|
| 5,459,577 A | 10/1995 | Ototake et al. | |
| 5,539,521 A * | 7/1996 | Otokake et al. | ............. 356/601 |
| 6,226,087 B1 | 5/2001 | Blaesing-Bangert | |
| 6,347,458 B1 | 2/2002 | Kaczynski | |
| 6,506,983 B1 * | 1/2003 | Babb et al. | ................ 178/18.01 |
| 6,549,271 B2 | 4/2003 | Yasuda et al. | |
| 6,693,700 B2 | 2/2004 | Shima | |
| 6,699,628 B2 | 3/2004 | Shima | |
| 6,762,826 B2 | 7/2004 | Tsukamoto et al. | |
| 6,809,802 B1 | 10/2004 | Tsukamoto et al. | |
| 7,046,334 B2 * | 5/2006 | Kono et al. | .................... 355/53 |
| 7,126,689 B2 * | 10/2006 | Nishi | ......................... 356/400 |
| 2005/0214657 A1* | 9/2005 | Mitsui | ............................ 430/5 |

FOREIGN PATENT DOCUMENTS

JP   2009025304 A   *   2/2009

OTHER PUBLICATIONS

Blaesing, C., "Pattern Placement Metrology for Mask Making," SEMI, Mar. 31, 1998.
Roeth, K. D. et al., "Mask metrology for high end semiconductor application using the LEICA LMS IPRO," Scientific and Technical Information, vol. XI, No. 5, pp. 130-135, Oct. 1997.

* cited by examiner

*Primary Examiner*—Tung S Lau
*Assistant Examiner*—Xiuquin Sun
(74) *Attorney, Agent, or Firm*—Houston Eliseeva LLP (57) ABSTRACT

A method for allocating correction values of the degree of bending of a substrate (2) relative to a coordinate system (40) of a coordinate measuring machine (1) is disclosed. The positions of the at least two reference marks (32) on the substrate holder (27) are automatically determined relative to the coordinate system (40) of the coordinate measuring machine (1) for each substrate (2) currently placed in the substrate holder (27) in the coordinate measuring machine (1).

6 Claims, 6 Drawing Sheets

METHOD FOR DETERMINING CORRECTION VALUES FOR THE MEASURED VALUES OF POSITIONS OF STRUCTURES ON A SUBSTRATE

RELATED APPLICATIONS

This application claims priority to German Patent Application No. DE 10 2007 033 619.7, filed on Jul. 17, 2007, which is incorporated herein by reference in its entirety.

FIELD OF THE INVENTION

The present invention relates to a method for allocating correction values relating to the bending of a substrate, to the measured values of positions of structures on a substrate relative to the coordinate system of a coordinate measuring machine.

BACKGROUND OF THE INVENTION

A measuring device as used for measuring structures on substrates used for the manufacture of wafers (masks) has been disclosed in the paper entitled "Pattern Placement Metrology for Mask Making" by Dr. Carola Bläsing. The paper was held at the Semicon Education Program Convention in Geneva on Mar. 31, 1998. The description given there is the basis for a coordinate measuring machine as used in carrying out the method according to the present invention.

German Patent Application DE 198 17 714 discloses a method for measuring structures on a mask surface. The mask is placed in a coordinate measuring device on a measuring stage translatable in a plane vertical to the optical axis of the imaging measuring system in an interferometrically measurable fashion. In the method described here the mask is aligned relative to the coordinate system of a measuring device.

U.S. Pat. No. 5,459,577 discloses a method for determining the position of structures on the surface of a substrate. Herein, the device measures a first degree of bending, wherein the first degree of bending is produced by a particular configuration of support points of the substrate. Subsequently a second degree of bending is measured produced by a different configuration of support points. The form of the bending differs according to the position and location of the support points for the substrate. As it cannot be guaranteed that the substrate is always placed in the same position on the support points, this would mean that a corresponding measurement of the degree of bending or deformation would have to be carried out on the basis of the position of the support points for each newly inserted substrate. This is extremely time-consuming and thus reduces the throughput of substrates when the positions of structures on the substrate are measured.

The article by K.-D. Röth and K. Rinn published in "Mitteilungen für Wissenschaft und Technik" Vol. XI, No. 5, page 130 to 135, October 1997, describes mask metrology and its use in semiconductor manufacture. The nominal accuracy of a coordinate measuring machine is determined by the orientation in which a mask is placed on a substrate holder. If, for example, the mask is measured in four orientations (0°, 90°, 180° and 270°), slightly different measuring results will be obtained for each orientation. This demonstrates quite clearly that the insertion of the substrate in the substrate holder and their subsequent orientation to a coordinate system of the measuring stage and/or coordinate measuring machine has a critical effect on the degree of bending and ultimately on the accuracy of the measured values determined for the individual structures on the substrate.

U.S. Patent Application 2004/0036850 A1 discloses a support system for a wafer. The support system is used in an exposure system for substrates on a wafer. Herein a substrate, a wafer, is suctioned onto a plurality of support points on the support system by means of a vacuum. The air pressure can be varied between the support points to adjust the degree of bending of the substrate between the support points. This does not deal with the problems arising from the measurement of structures on a substrate with a coordinate measuring machine.

U.S. Patent Applications 2003/0016338 and 2003/0118925 are also concerned with exposure apparatus for masks on a wafer. The problems arising from measuring structures on a substrate with a coordinate measuring machine are not addressed here.

German Patent Application DE 198 58 428 A1 discloses a traversable X/Y coordinate measuring stage of a coordinate measuring machine. The substrate with the structures to be measured is supported on three support points. A correction of the measured values of the positions of the structures with respect to the position of the substrate relative to the coordinate system of the coordinate measuring machine is not disclosed.

SUMMARY OF THE INVENTION

It is an object of the present invention to provide a method to determine correction values for the bending of a substrate as a function of the alignment of the substrate relative to the coordinate system of a coordinate measuring machine, to enable the measured values of the positions of the structures on the substrate to be corrected.

This object is solved by a method for determining correction values for positions of structures on a substrate, wherein the correction values are determined on the basis of a degree of bending of the substrate in a substrate holder relative to a coordinate system of a coordinate measuring machine, comprising the steps of:

calculating the degree of bending of the substrate for each type of substrate, wherein the correction values for the degree of bending of the substrate are known relative to a reference point, and wherein the substrate is supported on three support points in the substrate support;

determining the position of two reference marks on the substrate holder with respect to the reference point for each substrate holder used with coordinate measuring machine;

automatically determining a position of the at least two reference marks on the substrate holder relative to the coordinates system of the coordinate measuring machine for the substrate holder currently being used in the coordinate measuring machine, wherein the position of the reference point relative to the coordinate system of the coordinate measuring machine is calculated herefrom; and determining on the basis of the measuring result for the position of the reference point, the allocation of correction values for calculation of the degree of bending of the substrate currently in the substrate holder relative to the coordinate system of the coordinate measuring machine, at each point of the substrate at which measurement of the position of a structure on the substrate was carried out.

The method is used to calculate correction values for the measured values of positions of structures on a substrate, wherein the correction values are determined on the basis of the degree of bending of a substrate in a substrate holder relative to the coordinate system of a coordinate measuring machine. This has the particular advantage that for every type of substrate, the bending of the substrate is calculated for any points on the substrate, wherein the correction values for the bending of the mask are known with respect to a reference point. Herein the zero point or reference point of the correction values for the degree of bending can be a support point of the substrate in the substrate holder. The substrate is supported on three support points in the substrate holder. For each substrate holder used with the coordinate measuring machine the position of two reference marks on the substrate holder is determined in relation to the reference point. The position of the at least two reference marks on the substrate holder relative to the coordinate system of the coordinate measuring machine is automatically determined for the substrate holder currently in use in the coordinate measuring machine. The position of the reference point relative to the coordinate system of the coordinate measuring machine is thus calculated. On the basis of the measuring result for the position of the reference point, the allocation of correction values for the calculation of the degree of bending of the substrate currently in the substrate holder relative to the coordinate system of the coordinate measuring machine is determined at each point on the substrate at which a measurement of the position of a structure on the substrate was carried out.

A displacement of the substrate holder relative to the coordinate system of the coordinate measuring machine is determined.

The rotation of the substrate holder with reference to the coordinate system of the coordinate measuring stage can also be determined. In addition, it is possible to determine a displacement and a rotation of the substrate holder relative to the coordinate system of the coordinate measuring machine.

The substrate is provided with at least two reference marks. The substrate holder is provided with at least three support points for the substrate.

The calculation of the degree of bending of the substrate can be carried out, for example, using the finite-element method. Herein the previously determined position of the support points for the substrate relative to the coordinate system of the coordinate measuring machine and the position of the substrate holder relative to the coordinate system of the coordinate measuring machine are used to calculate the degree of bending of the substrate.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
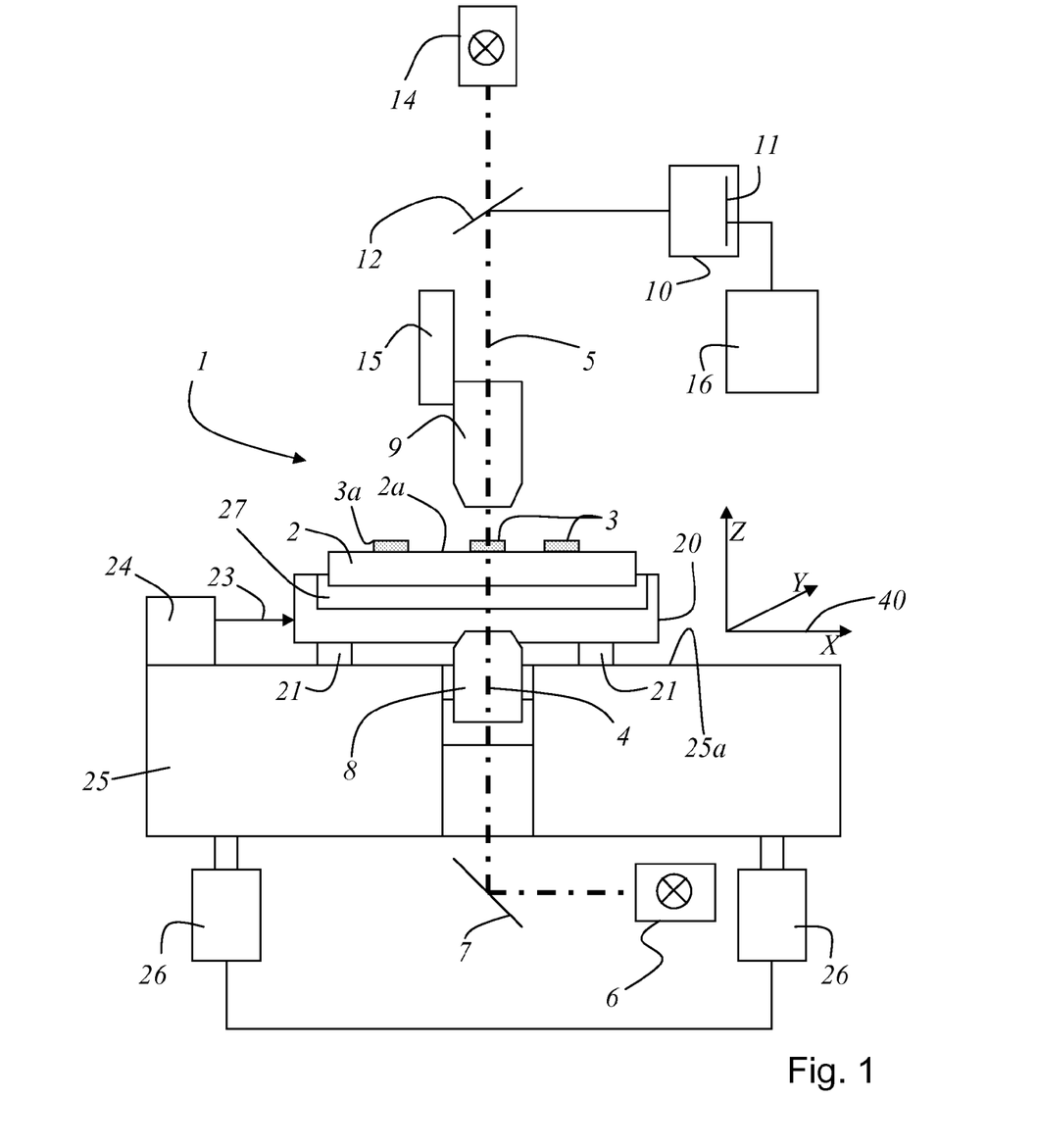
FIG. 1 schematically shows a coordinate measuring machine, according to the state of the art, in which the method according to the present invention can be carried out.

A coordinate measuring machine 1 of the type described in FIG. 1 is already well known from the prior art. Basically the coordinate measuring machine 1 comprises a plane 25$a$, in which a measuring stage 20 supported on air bearings is arranged, moveable and traversable in plane 25$a$. In the embodiment shown here, plane 25$a$ is defined by the X coordinate direction and the Y coordinate direction. Measuring stage 20 is advantageously traversable on air bearings 21 in plane 25$a$. A substrate holder 27 can be received in measuring stage 20, to support a substrate 2 having a plurality of structures 3 arranged on its surface 2$a$. The position of measuring stage 20 is detected by at least one laser interferometer 24 which emits a measuring light beam 23. In the embodiment shown here, plane 25$a$ in which measuring stage 20 is moveably arranged is formed by a granite block. It will be understood by a person skilled in the art that this granite block 25 can also be formed of any other material able to provide a stable plane 25$a$ required for moving measuring stage 20.

Granite block 25 is supported in a vibration-damped manner on vibration-dampers 26. A transmitted-light illumination means 6 and an incident-light illumination means 14 are provided for illumination of substrate 2 and structures 3, respectively. In the embodiment shown here, the light from the transmitted-light illumination means 6 is coupled into the transmitted-light illumination axis 4 via reflecting mirror 7. The light emitted by transmitted-light illumination means 6 is directed to substrate 2 via a condenser 8. The incident-light illumination means 14 emits light in the incident-light illumination beam path 5. The light emitted by incident-light illumination means 14 is directed to substrate 2 via a measuring lens 9. Measuring lens 9 thus collects the light from substrate 2 emitted by incident-light illumination means 14 or transmitted-light illumination means 6. The light collected by measuring lens 9 is passed via a reflecting mirror 12 to a camera 10, comprising a detector 11. Detector 11 is connected to a computer 16, which converts the recorded signals into a digital image. Measuring lens 9 with a displacement means 15 is arranged moveable in the Z coordinate direction, wherein measuring lens 9 can be focused onto surface 2a of substrate 2, or onto structure 3 to be imaged, using displacement means 15.

Coordinate measuring machine 1 can be used to precisely determine the position of structures 3 applied to surface 2a of substrate 2 with respect to coordinate system 40 of coordinate measuring machine 1. To determine the position of individual structures 3, two opposing edges 3a of a structure 3 are measured for each structure 3 to be measured. The position of the two opposing edges can then be derived from the measured intensity profile of structure 3. The position of an edge 3a of a structure is determined by a coordinate measuring machine 1 in the nanometer or sub-nanometer range. It is therefore obvious, that bending of the substrate will have a substantial effect on the precise measurement of the position of an edge 3a of a structure 3. The measured values of the position of an edge 3a of a structure 3 can only be corrected with respect to the degree of bending of a substrate if it is assumed that the substrate holder 27 together with substrate 2 will always be inserted into coordinate measuring machine 1 in the same way. The substrate holder 27 should always be placed in measuring stage 20 in the same orientation with respect to coordinate system 40 of coordinate measuring machine 1. This can, of course, not be guaranteed, it is therefore absolutely essential for each measurement, to know the exact position of the support points of substrate 2 in substrate holder 27, the orientation of substrate holder 27 in measuring stage 20 and thus the orientation of substrate holder 27 with respect to coordinate system 40 of coordinate measuring machine 1.

Figure 2:
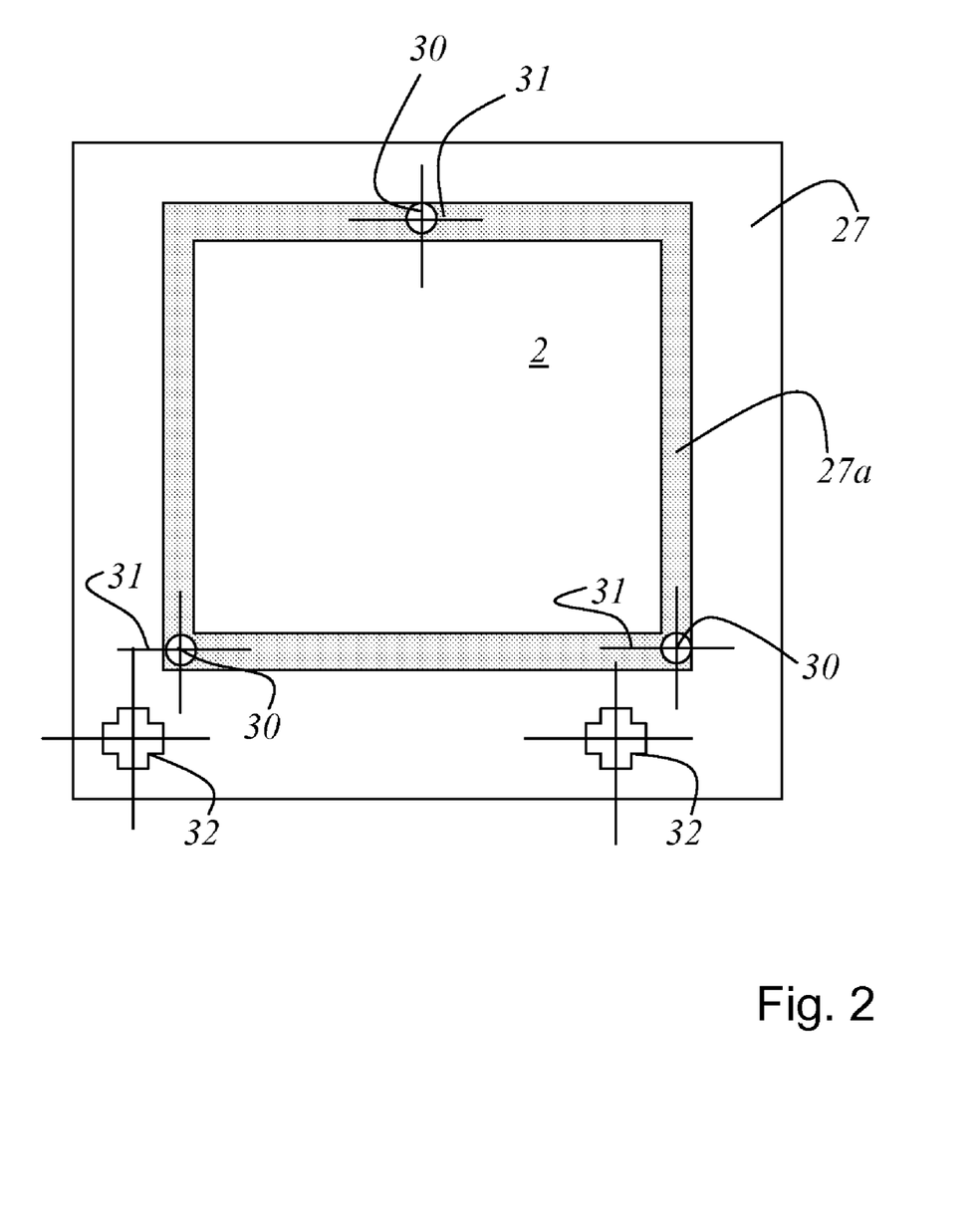
FIG. 2 schematically shows a top view of a substrate inserted in a substrate holder.

FIG. 2 shows a schematic arrangement of a substrate 2 in a substrate holder 27. Substrate holder 27 is configured as a frame and comprises a peripheral edge 27a. On peripheral edge 27a three support points 30 are formed for substrate 2. Support points 30 are, for example, formed of ruby balls. The substrate 2 is thus clearly supported on the three support points. On the basis of the defined support configuration it is possible to calculate the degree of bending of substrate 2. All the physical and geometric parameters of substrate 2 required for this purpose are already known. Support points 30 for substrate 2 are each marked by crosses 31 in FIG. 2a. Substrate holder 27 also comprises at least two reference marks 32. The positions of the two reference marks 32 on the substrate holder can thus be used to determine the position of the substrate holder relative to the coordinate system of the coordinate measuring machine.

Figure 3A:
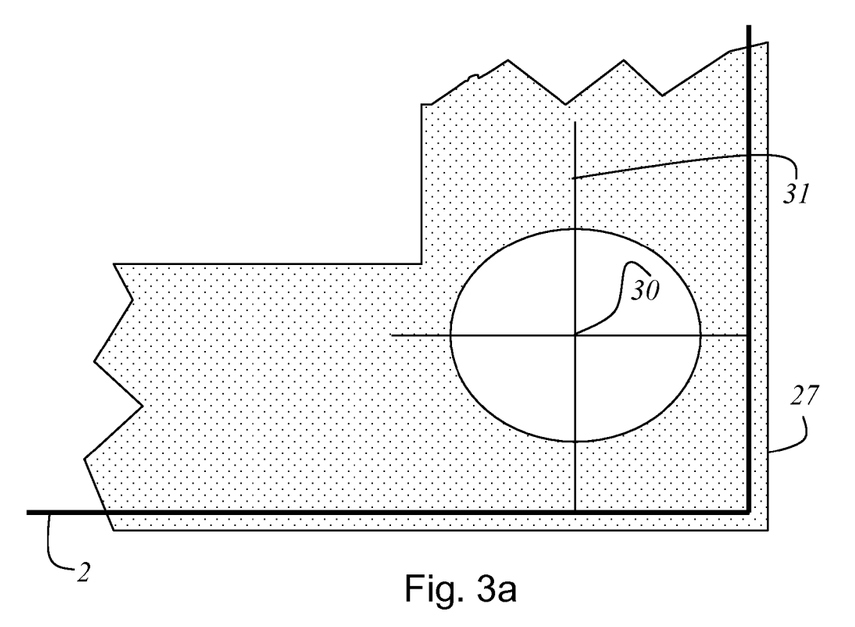
FIG. 3a is an enlarged view of a substrate inserted in a substrate holder, wherein in this view the substrate is positioned in the substrate holder without displacement.

Not only substrate holder 27 can be displaced and/or rotated in coordinate measuring machine 1, substrate 2 can also be placed in substrate holder 27 in a displaced and/or rotated manner. FIG. 3a is an enlarged view of the position of substrate 2 in substrate holder 27. In FIG. 3a substrate 2 is indicated with a thick black line. Herein, substrate 2 is positioned precisely in the substrate holder. The substrate is supported on a support point 30, which as explained in FIG. 2, is formed of a ruby ball. The position of support point 30 is marked by cross 31.

Figure 3B:
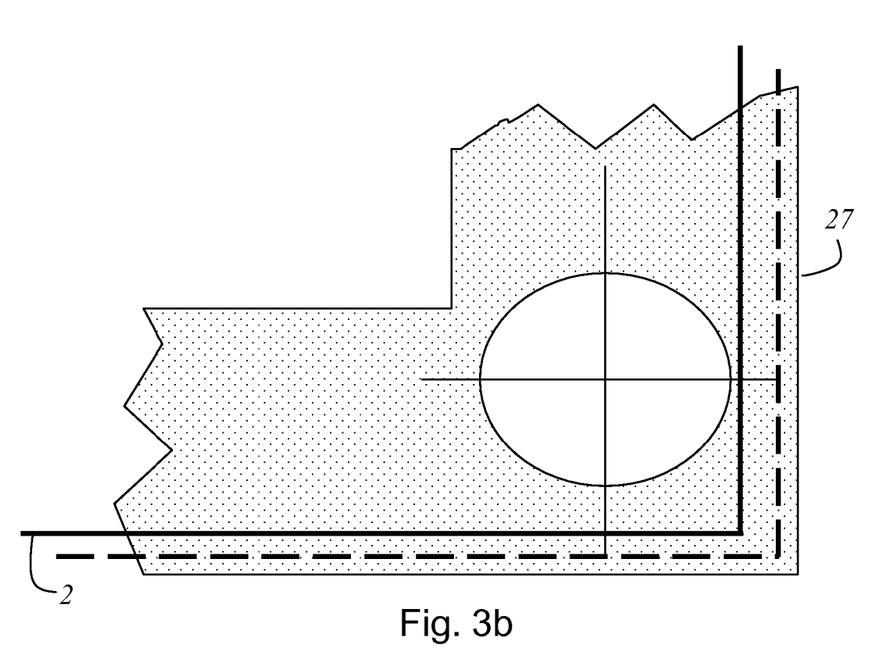
FIG. 3b is an enlarged view of a substrate inserted in a substrate holder, wherein the substrate is displaced with respect to the correct position in the substrate holder.

FIG. 3b shows a situation wherein substrate 2 is displaced with respect to the precise position of substrate 2 in the substrate holder. The precise position of substrate 2 in FIG. 3b is indicated by a thick broken line. The displaced position of substrate 2 in substrate holder 27 is shown by a thick solid line in FIG. 3b.

Figure 3C:
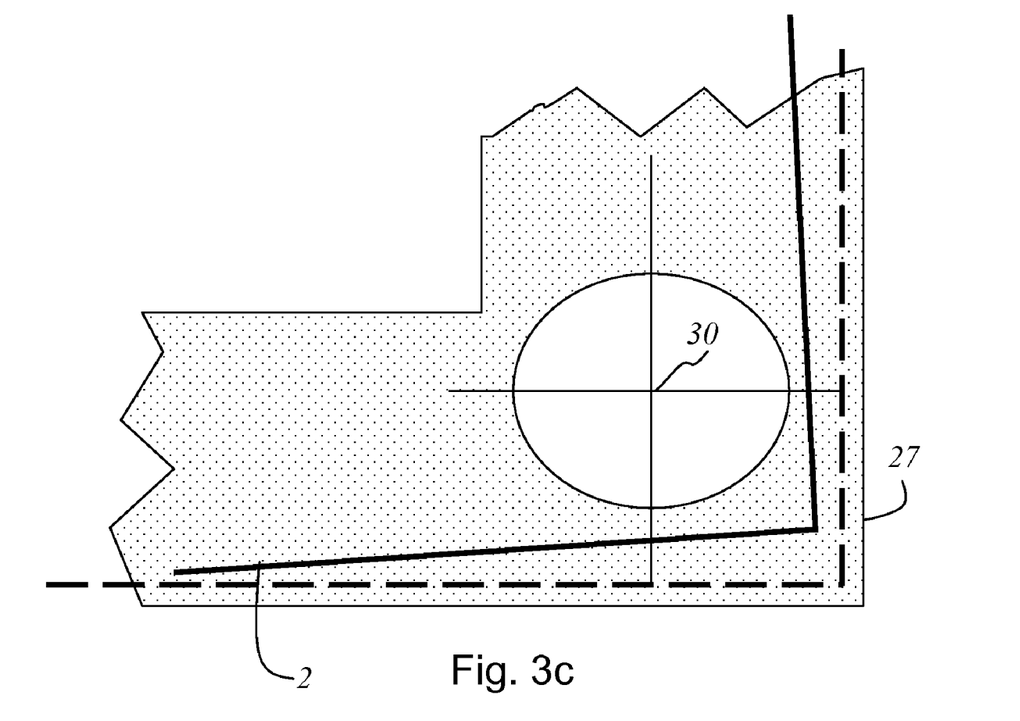
FIG. 3c is an enlarged view of the position of a substrate in the substrate holder, wherein the substrate inserted in the substrate holder is rotated with respect to the correct position of the substrate in the substrate holder.

FIG. 3c further shows an enlarged representation of the edge area of substrate holder 27, in which a substrate 2 is placed in a rotated position. The substrate in substrate holder 27 inserted in a precisely aligned position is also indicated by a thick broken line in FIG. 3c. The rotated substrate 2 is indicated by a thick solid line in FIG. 3c.

As can be seen clearly from FIGS. 3a to 3c, the substrate can be positioned in any number of ways on support points 30. As a result a plurality of different positions are obtained for support points 30 with reference to substrate 2, which in turn affects the real degree of bending of substrate 2. It thus goes without saying that this orientation and displacement or rotation of substrate 2 with respect to support points 30 must be known in order to calculate the precise degree of bending of substrate 2 and to use this to correct the measured values of the positions of structures 3 on substrate 2.

Figure 4A:
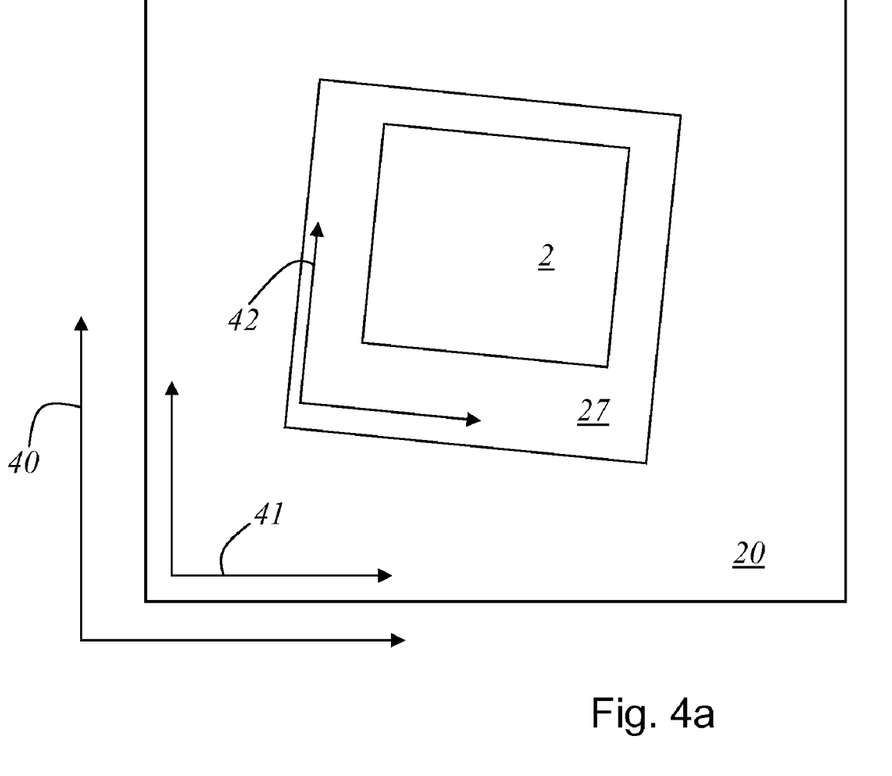
FIG. 4a is a diagram of the arrangement of a substrate holder containing a substrate on a measuring stage and the positional relationship of the measuring stage to the coordinate system of the coordinate measuring machine.

FIG. 4a shows the schematic arrangement of a substrate holder 27 with a substrate 2 in measuring stage 20. Herein substrate holder 27 defines a substrate holder coordinate system 42. Measuring stage 20 also comprises a measuring stage coordinate system 41. Further, coordinate measuring machine 1 comprises a coordinate measuring machine coordinate system 40. The positions of the individual coordinate systems 40, 41 and 42 in relation to each other must therefore be known in order to calculate correction values for the degree of bending of substrate 2 and to determine the precise position of structures 3 on substrate 2 in relation to coordinate system 40 of coordinate measuring machine 1. On the basis of the measuring results obtained for the position of the reference point or for one of the support points 30 of substrate 2, the allocation of correction values for the calculation of the degree of bending of each substrate 2 inserted in substrate holder 27 can be determined relative to coordinate system 40 of coordinate measuring machine 1 at each point on substrate 2 at which measurement was carried out.

Figure 4B:
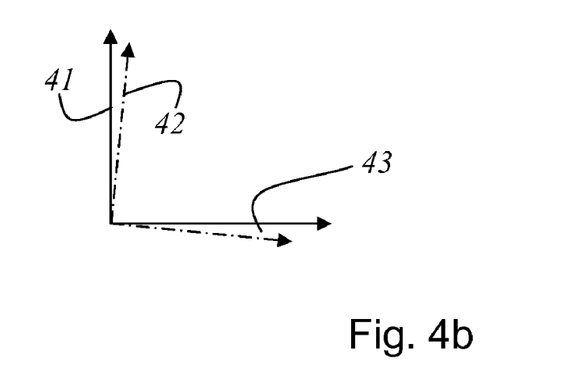
FIG. 4b shows the rotation of the coordinate system of the substrate holder with respect to the coordinate system of the coordinate measuring machine.

FIG. 4b shows the orientation of coordinate system 42 of substrate holder 27 with respect to coordinate system 41 of measuring stage 20. Coordinate system 42 of substrate holder 27 is indicated with a broken line in FIG. 4b. Coordinate system 42 of substrate holder 27 is rotated by an angle 43 with respect to coordinate system 41 of measuring stage 20. Using the present invention it is possible to determine this rotation or displacement of individual elements of coordinate measuring machine 1 with respect to one another and to use this to calculate the degree of bending of substrate 2.

Figure 5:
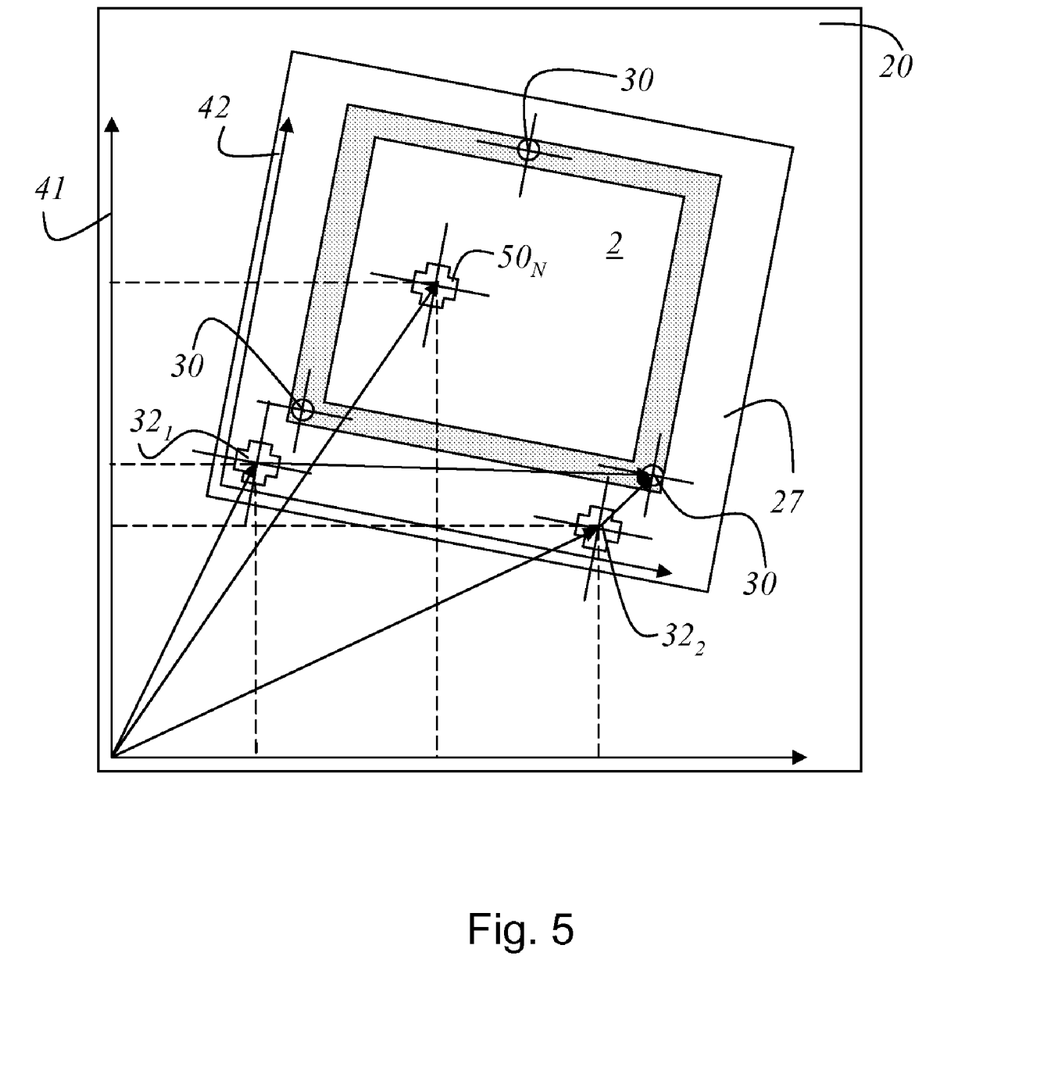
FIG. 5 shows a schematic arrangement of the substrate holder containing the substrate on a measuring stage of a coordinate measuring machine, wherein the rotation of the substrate holder with respect to the coordinate system of the measuring stage is exaggerated to enable better illustration of the relationship between the individual coordinate systems.

FIG. 5 shows a schematic representation of the arrangement of a substrate holder 27 in measuring stage 20 of a coordinate measuring machine 1. The arrangement of substrate holder 27 in measuring stage 20 of coordinate measuring machine 1 is exaggerated in the depiction to enable better illustration of the individual positions to be measured. Substrate holder 27 defines coordinate system 42 and measuring stage 20 defines coordinate system 41. At least one reference mark or reference position $50_N$ is defined on substrate 2. Substrate 2 is also supported on the at least three support points 30 in substrate holder 27. Further at least two reference marks $32_1$ and $32_2$ are defined on substrate holder 27.

First, at least one reference position $50_N$ or reference point P0 is defined by coordinate measuring machine 1 on substrate 2 in each substrate holder 27 currently being used for measurement. Usually reference point P0 is one of the support points 30 of substrate 2. For clarity, a description of how the position of structure 3 or a reference position is determined on substrate 2 is omitted here as such methods are well know from the prior art. The position of support point 30 is determined relative to the position of the two reference marks $32_1$ and $32_2$ on substrate holder 27. Ultimately for each substrate 2 inserted in substrate holder 27, the positions of at least two reference marks $32_1$ and $32_2$ on the substrate holder are automatically determined relative to coordinate system 40 of the coordinate measuring machine or relative to coordinate system 41 of measuring stage 20. From the measuring result, it is then possible to obtain the position of support point 30 for substrate 2 and the position of substrate holder 27 relative to the coordinate system of coordinate measuring machine 1 and herefrom, the resulting allocation of the correction values for the measured values of measured positions of structures 3 on substrate 2, whereby each substrate is inserted in substrate holder 27. The correction values can be used for any point on substrate 2 measured by coordinate measuring machine 1.

The position of reference mark $50_N$ on the substrate is determined relative to coordinate system 41 of the measuring stage, or to coordinate system 40 of the coordinate measuring machine. The relative position of the support point for substrate 2 in substrate holder 27 can be used to determine the position of rotation of substrate 2 relative to coordinate system 41 of measuring stage 20 or of coordinate system 40 of the coordinate measuring machine. Finally, by determining the positions of reference marks $32_1$ and $32_2$ on substrate holder 27, the rotation or displacement of substrate holder 27 relative to coordinate system 41 of measuring stage 20 or to coordinate system 42 of coordinate measuring machine 1 can be obtained.

As previously mentioned, the correction values for the bending of substrate 2 can be determined from the support configuration of substrate 2 or from support points 30. In order to save computing time it is conceivable that the correction values for all possible support point positions for substrate 2 be stored in tables in a database on a computer 16. The corresponding correction values could thus be obtained automatically from the database once the precise position of support points 30 is known without having to carry out an exact new calculation of the degree of bending.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining correction values for positions of structures on a substrate, wherein the correction values are determined on the basis of a degree of bending of the substrate in a substrate holder relative to a coordinate system of a coordinate measuring machine, comprising the steps of:

calculating the degree of bending of the substrate for each type of substrate, wherein the correction values for the degree of bending of the substrate are known relative to a reference point, and wherein the substrate is supported on three support points in the substrate support;

determining the position of two reference marks on the substrate holder with respect to the reference point for each substrate holder used with coordinate measuring machine;

automatically determining a position of the at least two reference marks on the substrate holder relative to the coordinates system of the coordinate measuring machine for the substrate holder currently being used in the coordinate measuring machine, wherein the position of the reference point relative to the coordinate system of the coordinate measuring machine is calculated herefrom; and determining on the basis of the measuring result for the position of the reference point, the allocation of correction values for calculation of the degree of bending of the substrate currently in the substrate holder relative to the coordinate system of the coordinate measuring machine, at each point of the substrate at which measurement of the position of a structure on the substrate was carried out.

2. The method according to claim 1, wherein the reference point is a support point of the substrate in the substrate holder.

3. The method according to claim 1, wherein a displacement of the substrate holder relative to the coordinate system of the coordinate measuring machine is determined.

4. The method according to claim 1, wherein a rotation of the substrate holder relative to the coordinate system of the coordinate measuring machine is determined.

5. The method according to claim 1, wherein a displacement and a rotation of the substrate holder are determined relative to the coordinate system of the coordinate measuring machine.

6. The method according to claim 1, wherein a calculation of the degree of bending of the substrate (2) is carried out with the finite-element method.

* * * * *